United States Patent [19]

Arita et al.

[11] Patent Number: 5,726,843
[45] Date of Patent: Mar. 10, 1998

[54] CURRENT LIMITING CIRCUIT BREAKER

[75] Inventors: Hiroshi Arita, Mito; Junzo Kida, Hitachi, both of Japan

[73] Assignee: Hitachi, Ltd., Tokyo, Japan

[21] Appl. No.: 561,252

[22] Filed: Nov. 21, 1995

[30] Foreign Application Priority Data

Nov. 21, 1994 [JP] Japan .................. 6-286532

[51] Int. Cl.[6] .............................................. H02H 3/08
[52] U.S. Cl. .............. 361/5; 361/3; 361/2; 361/8; 361/13; 361/63; 361/115
[58] Field of Search .......................... 361/2–13, 63, 361/58, 115

[56] References Cited

U.S. PATENT DOCUMENTS

| | | | |
|---|---|---|---|
| 4,227,145 | 10/1980 | Bonikowski et al. | 324/51 |
| 4,618,905 | 10/1986 | Tokuyama et al. | 361/4 |
| 4,675,798 | 6/1987 | Jost et al. | 363/54 |
| 4,700,256 | 10/1987 | Howell . | |
| 5,305,174 | 4/1994 | Morita et al. . | |
| 5,402,297 | 3/1995 | Ouchi et al. | 361/4 |

FOREIGN PATENT DOCUMENTS 6-76681   3/1994   Japan .

OTHER PUBLICATIONS

IEEE Transactions on Power Delivery, vol. 8, No. 4, Oct. 1993, "Solid–State Current Limiter for Power Distribution System", T. Ueda et al, pp. 1796–1801.

IEEE Transactions on Power Delivery, vol. 7, No. 2, Apr. 1992, "The Utility Requirements for a Distribution Fault Current Limiter", Slade et al, pp. 507–515.

IEEE Transactions on Power Delivery, vol. 9, No. 3, Jul. 1994, "400V Class High–Speed Current Limiting Circuit Breaker for Electric Power System", T. Genji et al, pp. 1428–1435.

*Primary Examiner*—Jeffrey A. Gaffin
*Assistant Examiner*—Jason L. W. Kost
*Attorney, Agent, or Firm*—Fay, Sharpe, Beall, Fagan, Minnich & McKee

[57] ABSTRACT

A plurality of solid-state switches are provided in parallel with a main circuit switch. A main circuit current is detected by a first current detecting device. A current flowing in each of the plurality of solid-state switches is detected by a second current detecting device. Based on the detected currents of the first and second current detecting devices, the main circuit switch is commanded to open and each solid-state switch is commanded to close by a control circuit, when a fault is detected by a fault detecting circuit. At this point of the process when the main circuit switch is opened, when a commutation anomaly is detected by a commutation detecting circuit, the conducting status of each solid-state switch is maintained. When the commutation achieves a normal status, each solid-state switch is interrupted and circuit breaking, at the point the capability of each solid-state switch is exceeded, is prevented.

15 Claims, 5 Drawing Sheets

5,726,843

CURRENT LIMITING CIRCUIT BREAKER

BACKGROUND OF THE INVENTION

1. Field of the Invention

The present invention relates to a current limiting circuit breaker, and especially to a current limiting circuit breaker that uses a switched valve device for suitably circuit breaking the power system.

2. Related Background Art

In recent years, with the economic development and the greater functional needs of the cities, there has been a rising demand for high and reliable supply of electric power to address the increasing need for power. In order to meet this demand, a regular network distribution system is being planned.

A prior distribution system operated without having the distribution transformers in parallel, but as regular networking progressed, the parallelizing of distribution transformers caused short circuiting of current to increase during faults due to short circuits. For this reason, high speed current limiting circuit breakers for protecting power systems are being developed. For instance, prior art technology such as the 1993 IEEE of Japan Power/Energy Conference No. 57 (IEEE: The institute of Electrical Engineers), IEEE Transactions on Power Delivery, Vol. 8, No. 4, 1796–1801 (1993), is known. The apparatus of the above reference is composed by a main circuit switch of a mechanical type (high-speed vacuum switch), a solid-state switch connected in parallel with the main circuit switch (gate turn-off thyristor: GTO thyristor), an element for absorbing energy, a fault detecting circuit, a control circuit, and a gate drive circuit. In this apparatus, when a fault developed in the system is detected by the fault detecting circuit, a command to close the solid-state switch and to open the main circuit switch is yielded from the control circuit via the gate drive circuit. When the main circuit switch opens at the contact points in response to this command, an arc develops between the contact points during the process of high speed opening of the contact points of the main circuit switch. This arc voltage acts as if a counter electromotive voltage is applied between the contact points, and therefore, the current flowing into the main circuit switch is commutated to the solid-state switch. After this, at the point the fault current has commutated completely, the solid-state switch has its gate turned off and the fault current is rapidly reduced.

However, in this prior technology, a structure in which a main circuit switch and a GTO thyristor are connected in parallel is used, but the timing for interrupting the GTO thyristor has not been adequately considered; and as for the fault current, there is a fear that the apparatus suffers from a lack in reliability because there is a high possibility that GTO thyristor will interrupt at the point when the fault current exceeds the GTO thyristor current interrupt capability.

That is, when the fault current is commutated to the GTO thyristor, there is a delay in the commutation start time or an extension of the commutation time because there is an element of instability in the arc voltage of the vacuum switch, which is the main circuit switch. In this instance, if the GTO thyristor is interrupted in a situation in which the current after commutation goes beyond the interrupt capability of the GTO thyristor, the GTO thyristor is short circuited and the limiting function on large currents ceases to function, creating a possibility of black outs in large areas. This type of technology described above is given in IEEE Transactions on Power Delivery, Vol. 7, No. 2, 507–515 (1992), IEEE Transactions on Power Delivery, Vol. 9, No. 3, pp. 1428–1435 (1994), Japanese Patent Laid-open No. 676681, U.S. Pat. No. 4,700,256, and U.S. Pat. No. 5,305,174.

SUMMARY OF THE INVENTION

The object of the present invention is to provide a current limiting circuit breaker for shutting off a solid-state switch, in consideration of the circuit breaking capability of the solid-state switch.

In order to realize the above object, the current limiting circuit breaker of the present invention comprises a main circuit switch inserted in a line of power supply lines that constitute the main circuit, a solid-state switch connected in parallel with the main circuit switch, fault detecting means for detecting faults in connection with a power supply of the main circuit, fault time command means for commanding the opening of the main circuit switch and the closing of the solid-state switch in response to the detection output of the fault detecting means, commutation detecting means for detecting currents flowing in the solid-state switch, and circuit breaking driving means for driving the circuit breaking of the solid-state switch when a current detected by the commutation detecting means indicates a normal value during the opening process of the main circuit switch.

With respect to the structure of the current limiting circuit breaker, it would be desirable to have a maintaining means for maintaining the conducting status of the solid-state switch in which the current detected by the commutation detecting means indicates an anomalous value when the solid-state switch is conducting in accordance with the command of the fault time command means. Further, in addition to the maintaining means, support circuit breaking command means for outputting a circuit breaking command to a circuit breaker connected in series with the main circuit switch, when the maintaining status of the solid-state switch according to the maintaining means exceeds a set time period.

With respect to the structure of the current limiting circuit breaker, the circuit breaking driving means can be replaced with a structure comprising main circuit current detecting means for detecting currents of the main circuit, main circuit current deciding means for deciding whether or not the detected output of the main circuit current detecting means has exceeded a set value to indicate an anomaly, commutation deciding means for deciding whether or not the detected output of the main circuit current deciding means has exceeded the set value for anomaly, and circuit breaking command means for commanding to circuit break the solid-state switch during the opening process of the main circuit switch with the condition that results of both the decision outputs of the main circuit current deciding means and the commutation deciding means are in the negative. Also, in this instance, it would be desirable to have maintaining means for maintaining the conducting status of the solid-state switch when the answer is in the affirmative for either result of the main circuit current deciding means or the commutation deciding means during the conduction of the solid-state switch in accordance with the command of the fault time command means, and to have support circuit breaking command means for outputting a circuit breaking command to a circuit breaker, connected in series with the main circuit switch, when the maintaining status of the solid-state switch according to the maintaining means exceeds a set time period.

As a further example, the current limiting circuit breaker comprises a solid-state switch inserted in a line of power supply lines that constitute the main circuit, a current limiting impedance element connected in parallel with the solid-state switch, fault detecting means for detecting faults in relation with a power supply of the main circuit, circuit breaking command means for commanding the circuit breaking of the solid-state switch in response to a detected output of the fault detecting means, main circuit current detecting means for detecting currents flowing into the solid-state switch, and maintaining means for maintaining the conducting status of the solid-state switch when the current detected by the main circuit current detecting means indicates an anomalous value during the process of circuit breaking of the solid-stale switch. Also, in this instance, it would be desirable to have support circuit breaking command means for yielding a circuit breaking command to a circuit breaker connected in series with the solid-state switch, when the maintaining status of the solid-state switch in accordance with the maintaining means exceeds a set time period.

It would be desirable to have the set time period for observing the maintaining status of the maintaining means set in correspondence with the time interval required for inverting the phase of the current at the fault detecting time, from the time of detection of a fault by the fault detecting means.

With respect to each structure of the above current limiting circuit breakers, it would be desirable to constitute the solid-state switch by a switched valve device. Further, it would be desirable to structure the solid-state switch with a plurality of switched valve devices and, at the same time, to have each of these switched valve devices mutually connected in an inverse-parallel fashion.

In accordance with the means described above, when a fault is detected in relation with the power supply of the main circuit, a command is given to open the main circuit switch and, at the same time, a command to close the solid-state switch is given. In the process of opening the main circuit switch, an observation is made on the commutation current flowing into the solid-state switch and the solid-state switch is driven to circuit breaking only in the event that a current at the time of commutation indicates a normal value. For this reason, circuit breaking of the solid-state switch can be prevented when the circuit breaking capability of the solid-state switch is exceeded. Further, the conducting status of the solid-state switch can be maintained when the current during commutation indicates an anomalous value by a delay of the commutation start time because of the status of the fault or by the extension of the commutation time. In this way, circuit breaking of the solid-state switch can be prevented when the commutation is in anomaly. Further, when the conducting status of the solid-state switch is held longer than the set time period, a fault current of a large current flows continuously into the main circuit. However, this large current flowing into the main circuit can be prevented by circuit breaking the circuit breaker connected in series with the main circuit switch.

Further, when deciding on the circuit breaking time of the solid-state switch based on the current flowing into the solid-state switch and the main circuit current, the circuit breaking of the solid-state switch can be prevented at the point in time when circuit breaking capability of the solid-state switch is exceeded, because the solid-state switch is made to interrupt with the condition that the current flowing into the solid-state switch does not exceed a set value of anomaly and that the main circuit current does not exceed a set value of anomaly. In this instance, when the value of the main circuit current exceeds a set value or the value of the current flowing into the solid-state switch exceeds a set value, the conducting status of the solid-state switch can be maintained and the circuit breaking of the solid-state switch, when the circuit breaking capability is exceeded, can be prevented with certainty. Still further, when the conducting status of the solid-state switch is maintained beyond the set time period, a continuous large current flow, in association with the fault, into the main circuit can be prevented because the circuit breaker connected in series with the main circuit switch is interrupted.

On the other hand, in the case where a solid-state switch is inserted into a main circuit, and a current limiting impedance element is connected in inverse-parallel with this solid-state switch, when a fault is detected, a command is given to the solid-state switch to interrupt; but in the event that a current flowing into the solid-state switch is detected as having an anomalous value, the conducting status of the solid-state switch is maintained. For this reason, a drive for circuit breaking can be prevented when the circuit breaking capability of the solid-state switch is exceeded. Also, in this instance, when the conducting status of the solid-state switch exceeds the set time period, the circuit breaker connected in series with the solid-state switch is interrupted, and a large current, in association with the fault, flowing into the main circuit can be averted.

DESCRIPTION OF THE PREFERRED EMBODIMENTS

Below, an embodiment of the present invention is explained with reference to figures.

Figure 1:
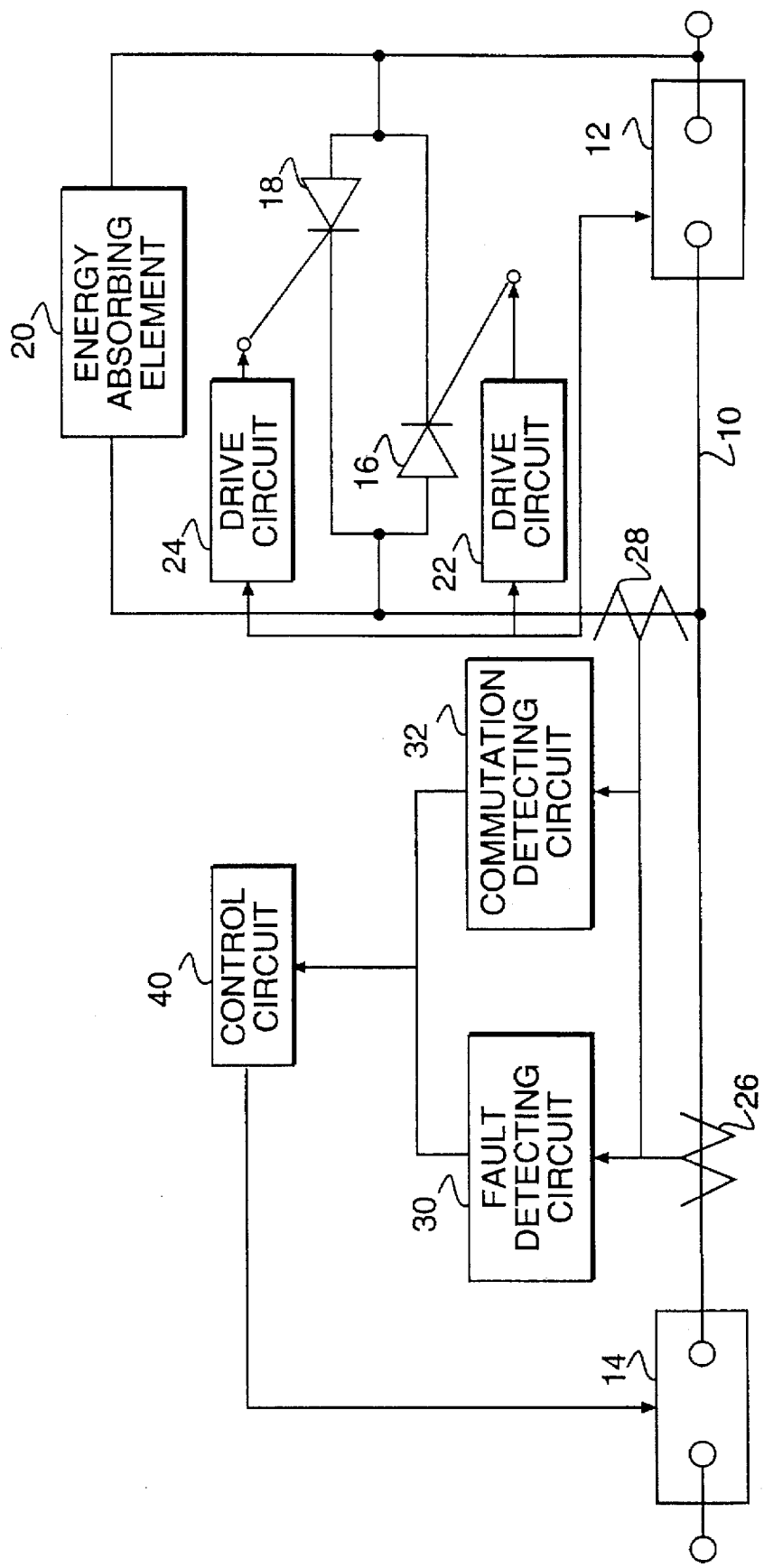
FIG. 1 shows a diagram of an embodiment of the current limiting circuit breaker of the present invention.

FIG. 1 shows a diagram of an embodiment of the current limiting circuit breaker of the present invention. With regard to FIG. 1, a main circuit switch 12 and a circuit breaker 14 are connected in series and inserted in a line of power supply lines 10 that constitute the main circuit. In the main circuit switch 12, solid-state switches 16 and 18 comprised by switched valve devices, such as GTO (gate-turn-off) thyristors, IGBTs (Insulated Gate Bipolar Transistors) and the like, are connected in parallel; and an energy absorbing element 20 is also connected in parallel. The solid-state switches 16 and 18 are connected in an inverse-parallel fashion, and these switches constitute a commutation circuit. Furthermore, the gates of these switches are supplied with switching signals from drive circuits 22 and 24.

On the other hand, the main circuit comprises a current detecting device 28 as commutation detecting means for detecting currents flowing into the solid-state switches 16 and 18 in the commutation circuit and a current detecting device 26, which constitutes main circuit current detecting means for detecting currents flowing in the main circuit. Outputs of the current detecting devices 26 and 28 are supplied to a fault detecting circuit 30 and a commutation detecting circuit 32.

Figure 2:
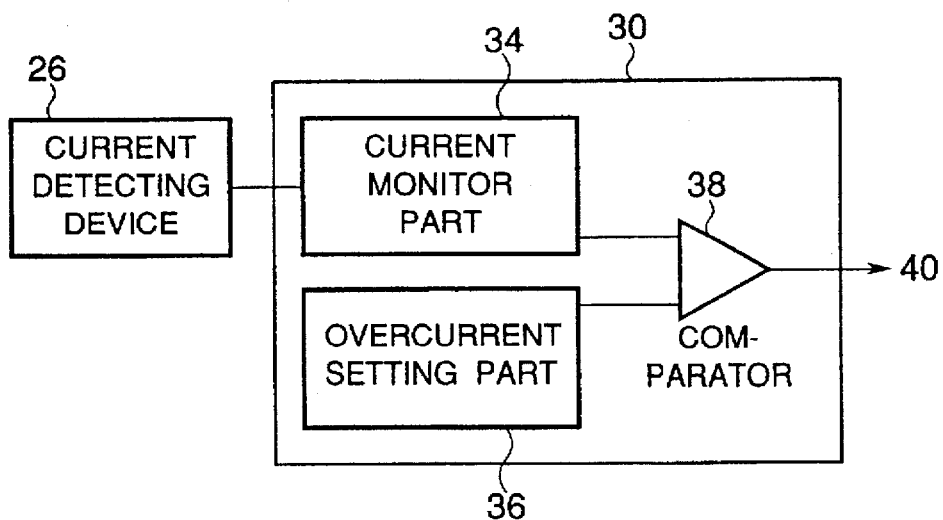
FIG. 2 shows a block diagram of a current detecting circuit.

The fault detecting circuit 30, as shown in FIG. 2, comprises a current monitor part 34, an overcurrent setting part 36, and a comparator 38. The current monitor part 34 is designed for processing such as filter processing for removing the high frequency components with respect to the detected current of the current detecting device 26. The overcurrent setting part 36 is set to an overcurrent value with respect to a fault in relation with the power supply of the main circuit, such as a short circuit fault. The comparator 38 compares the output of the current monitor part 34 and a set value predetermined in the overcurrent setting part 36 and yields a fault detecting signal of high level to a control signal 40 when the output of the current monitor device 26 exceeds the set value and, hence, it is deemed that a fault was produced. That is, the current detecting device 26 and the fault detecting circuit 30 constitute the fault detecting means.

With respect to determining a fault, a method for detecting a changed part of the current, instead of determining the level of the current, can be utilized also. That is, with the current monitor part 34, the current changed part is observed, and by setting a set value in the overcurrent setting part 36 with respect to the current changed part during a fault, the fault can be detected from the changed part of the current.

Figure 3:
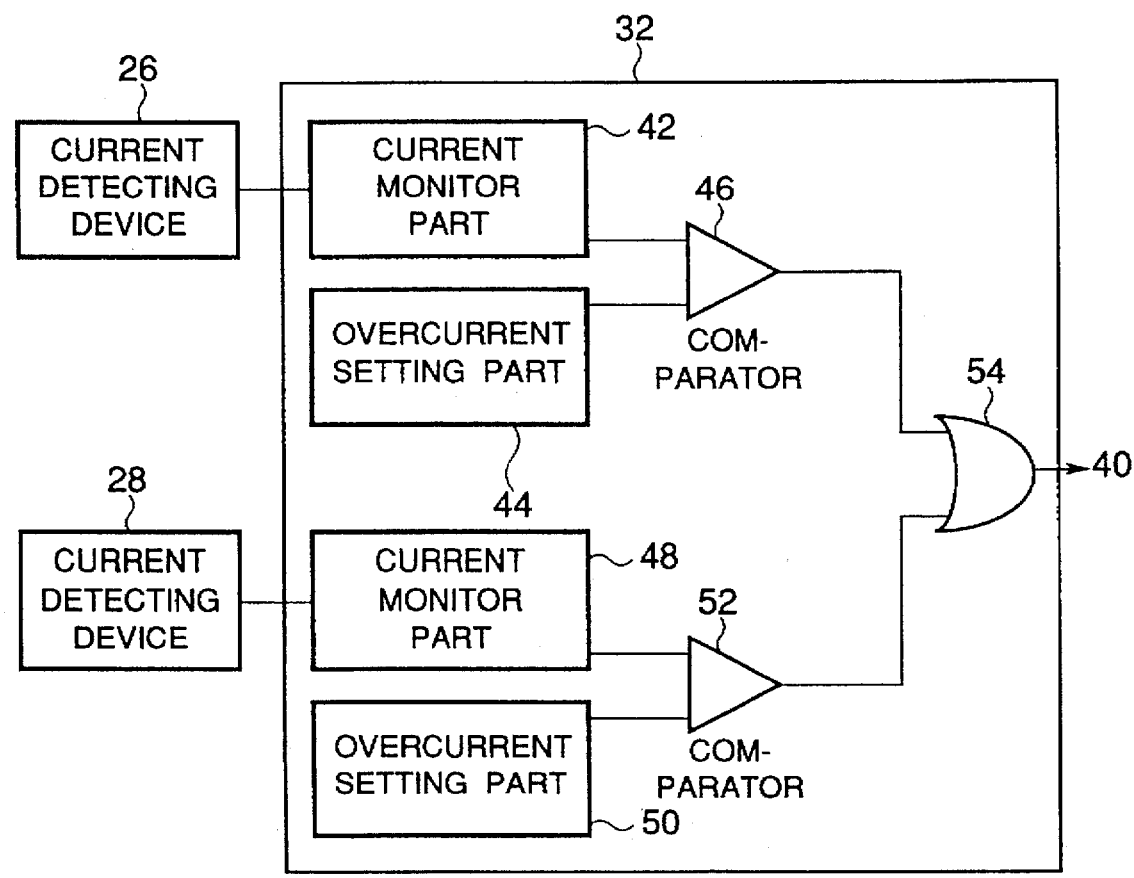
FIG. 3 shows a block diagram of a commutation detecting circuit.

The commutation detecting circuit 32, as shown in FIG. 3, comprises a current monitor part 42, an overcurrent setting part 44, a comparator 46, a current monitor part 48, an overcurrent setting part 50, a comparator 52, and an OR circuit 54. The current monitor part 42 receives the detected current of the current detecting device 26 and conducts processing of inputs such as filter processing, which cuts off the high frequency components of this current. The overcurrent setting part 44 sets an overcurrent value during commutation operation. That is, it sets the set value that indicates a current anomaly of the main circuit during commutation operation. This set value is set to a value larger than the value set in the overcurrent setting part 36. Moreover, the comparator 46 compares the output of the current monitor part 42 and the value of the overcurrent setting part 44 and yields to the OR circuit 54 a high-level signal that indicates commutation anomaly, when the output of the current monitor part 42 exceeds the set value. That is, the current monitor part 42, the overcurrent setting part 44, and comparator 46 constitute main circuit current deciding means.

On the other hand, the current monitor part 48 reads the detecting current of the current detecting device 28 and is made for processing such as filter processing to cut the high frequency components with respect to this current. An overcurrent value for indicating an anomalous value of a current flowing into the solid-state switches 16 and 18 is set in the overcurrent setting part 50. The comparator 50 compares the output of the current monitor part 48 and the set value predetermined in the overcurrent setting part 50 and yields to the OR circuit 54 a high-level signal for indicating anomaly of commutation when the output of the current monitor 48 exceeds a set value. That is, the current monitor part 48, the overcurrent setting part 50, and the comparator 52 compose the commutation deciding means.

The OR circuit 54 outputs to the control circuit 40 a high-level commutation anomaly signal when the high-level signal is inputted from the comparator 52 or the comparator 46 and outputs a low-level signal otherwise.

The control circuit 40 forms the fault time commanding means for commanding the main circuit switch 12 to open the circuit by responding to a high-level signal received from the fault detecting circuit 30 and for commanding, at the same time, the solid-state switches 16 and 18 to close the circuit. Furthermore, the control circuit 40 detects the detected output of the commutation detecting circuit 32 in the opening process of the main circuit switch 12, forms the maintaining means for maintaining the conducting status of the solid-state switches 16 and 18 during a high-level commutation anomaly signal is outputted from the commutation detecting circuit 32, and forms the support circuit breaking command means for yielding a circuit breaking command to the circuit breaker 14 when this maintaining status exceeds a set time period. Moreover, the control circuit 40 detects the detected output of the commutation detecting circuit 32 and forms the circuit breaking command means for commanding the circuit breaking of the solid-state switches 16 and 18 via driving circuits 22 and 24 when the output of the commutation detecting circuit 32 is at a low-level, indicating a normal current status, during the opening process of the main circuit switch 12.

Figure 4:
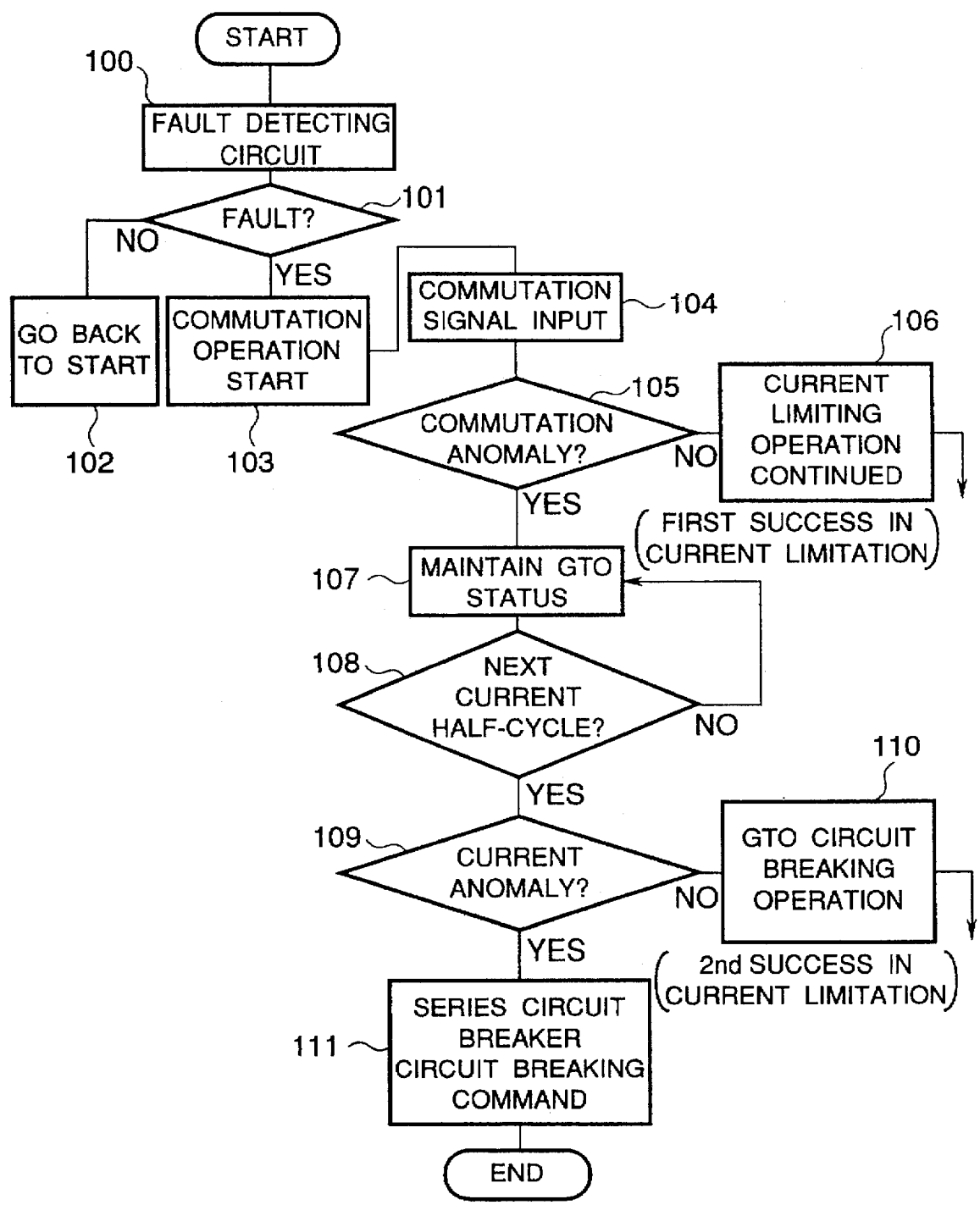
FIG. 4 is a flow chart for describing a use of the apparatus shown in FIG. 1.

Next, uses of the present invention will be explained with reference to FIGS. 4 and 5.

First, the output of the fault detecting circuit 30 is read (step 100) and the control circuit 40 determines whether or not a fault has been produced in the system connected to the main circuit (step 101). If decided by the control circuit 40 that there is no fault, the step is returned to the beginning status (step 102).

On the other hand, if decided that there is a fault, a commutation operation is started (step 103). That is, the main circuit switch 12 is commanded to open and, at the same time, the solid-state switches 16 and 18 are commanded to close. At this point, a current the flows in the main circuit switch 12, as indicated by the characteristic A of FIG. 5, increases gradually, but the opening of the main circuit switch 12 is started, and when commutation is started at time T1 by the electrostatic voltage of an arc produced during the opening, the main circuit current (characteristic A) decreases gradually. At this point, a current, indicated by characteristic B, flows in the solid-state switches 16 and 18 in place of the decrease of the main circuit current. At time T2 commutation is completed. In this way, after the commencement of the commutation operation, the main circuit current and the currents flowing in the solid-state switches 16 and 18 are detected. That is, the output of the commutation detecting circuit 32 is detected (step 104) and whether or not a commutation anomaly has been produced is determined (step 105).

Figure 5A:
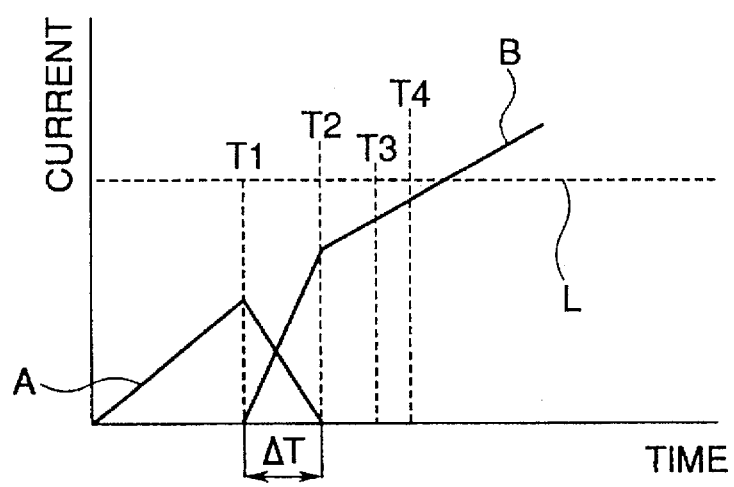
FIG. 5A is a time chart for describing an operation of each part of the apparatus shown in FIG. 1.

At this point, as shown in FIG. 5A, when it is decided that the value of the main circuit current (characteristic A) and the current (characteristic B) flowing in the solid-state switches 16 and 18 both do not exceed the overcurrent set value, that is, when there is a low-level signal produced from the OR circuit 54, the solids-state switches 16 and 18 are commanded to circuit break at time T3, and circuit breaking by the solid-state switches 16 and 18 occur with certainty at time T4. Since the level at this point is below the controllable current level L, which indicates the circuit breaking capability of the solid-state switches 16 and 18, circuit breaking can be conducted while protecting the solid-state switches 16 and 18.

Figure 5B:
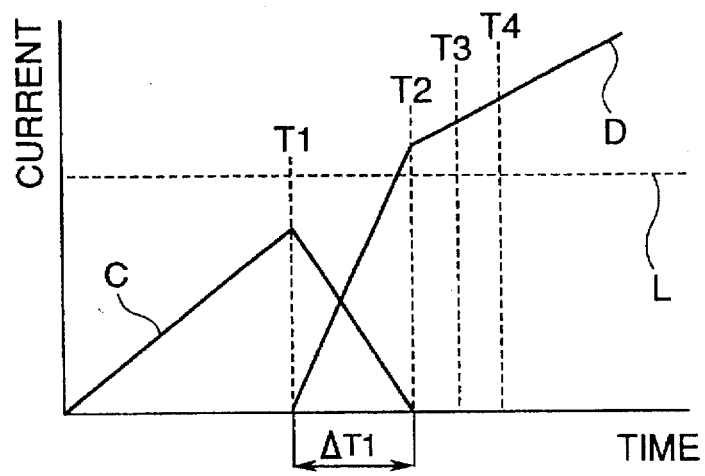
FIG. 5B is a time chart for describing an operation of each part of the apparatus shown in FIG. 1.
Figure 5C:
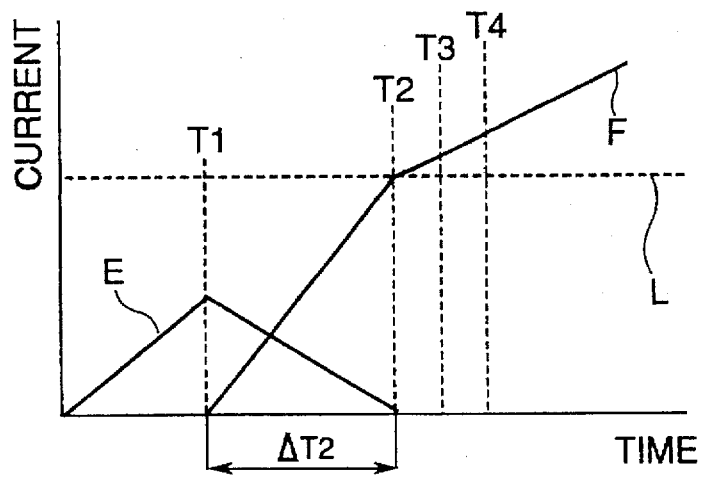
FIG. 5C is a time chart for describing an operation of each part of the apparatus shown in FIG. 1.

On the other hand, when there is a long delay before the start of commutation, as shown by characteristics C and D in FIG. 5B, or when the commutation time ΔT2 is long and the main circuit current exceeds the overcurrent set value or the current flowing in the solid-state switches 16 and 18 exceeds the overcurrent set value, as shown by characteristics E and F in FIG. 5C, a high-level signal is yielded from the commutation detecting circuit 32 and it is decided that there is a commutation anomaly. In this instance, since circuit breaking below the controllable current level L is not possible, the conducting status of the solid-state switches 16 and 18 are maintained (step 107). This status is continued until the next current half-cycle, during which the phase of the fault current inverts (step 108). After this, whether or not there is a commutation anomaly is determined again (step 109), and when there is no commutation anomaly, a command is given to circuit break the solid-state switches 16 and 18 (step 110).

On the other hand, when it is decided that there is again a commutation anomaly, circuit breaking is commanded to the circuit breaker 14 while maintaining the status of the solid-state switches 16 and 18 (step 111), and hence, the destruction of the solid-state switches 16 and 18 are prevented beforehand by responding to the commutation anomaly.

In this way, concerning the present embodiment, when a fault is produced, the solid-state switches 16 and 18 are prevented from being destroyed beforehand even though there is a delay in the commutation start time by the instability of the arc produced during the opening of the main circuit switch 12 and even though the commutation time is long, because the solid-state switches 16 and 18 are circuit broken only when the commutation during the process of opening the main circuit switch 12 is in a normal status.

Figure 6:
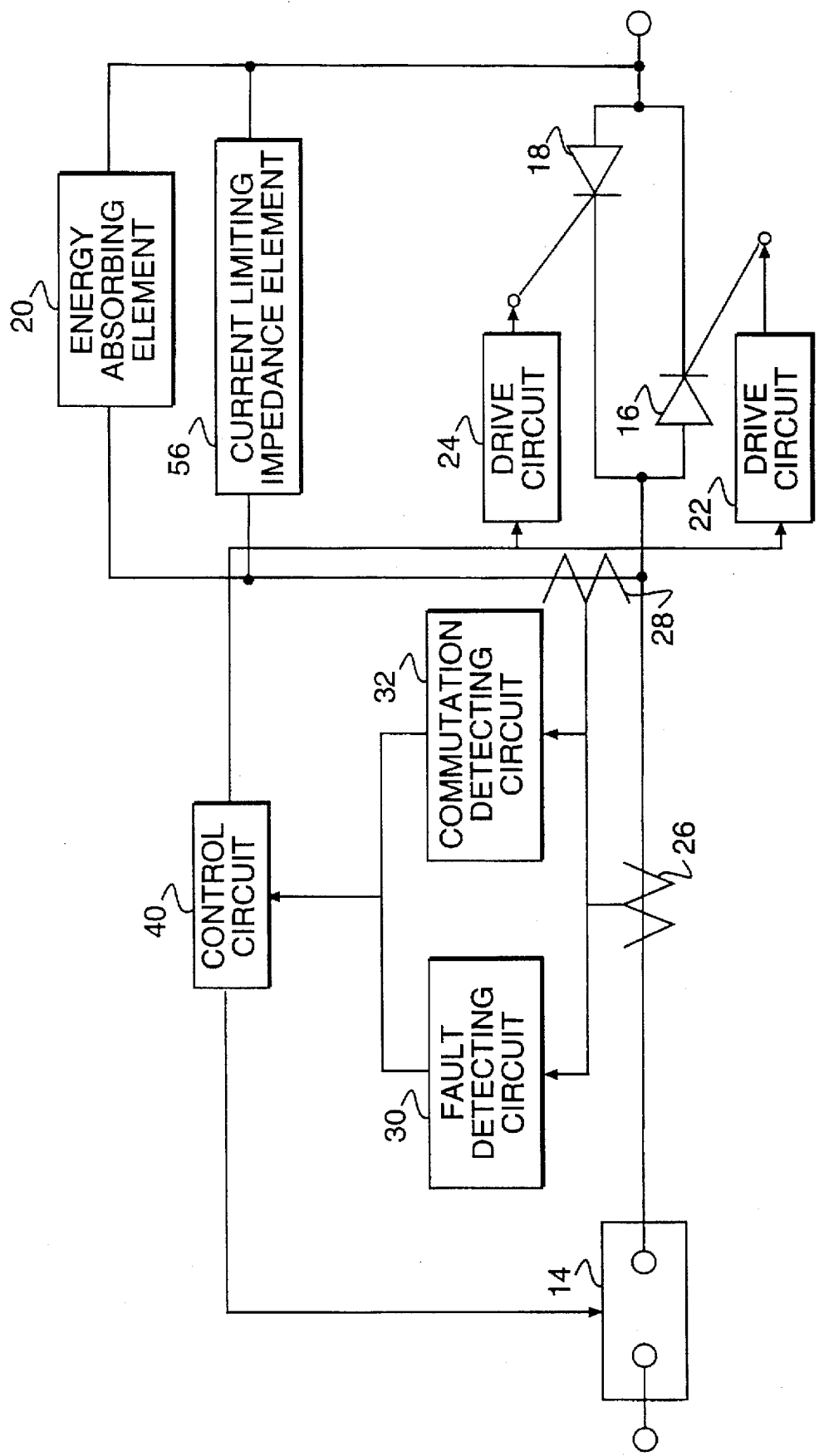
FIG. 6 shows a diagram of another embodiment of the present invention.

Furthermore, in the present embodiment, during the anomalous commutation time, the solid-state switches 16 and 18 are operated with the same condition, but only the status of the solid-state switches of arms where current is flowing is stored, and when the solid-state switches of arms where current is not flowing are made to undergo circuit breaking operation, the circuit breakage becomes certain at the next current half-cycle. Next, the second embodiment of the present invention is explained with reference to FIG. 6.

In the present embodiment, instead of the main circuit switch 12, the solid-state switches 16 and 18 are inserted into the main circuit and the solid-state switches 16 and 18 are connected in parallel with the current limiting impedance element 56; and other structures are the same as in FIG. 1, and therefore, the same structure has the same symbol and the explanation on these will be abbreviated.

Concerning the present embodiment, when a fault has been detected by the fault detecting circuit 30, the structure is such that a command to circuit break the solid-state switches 16 and 18 is given from the control circuit 40, but the current flowing in the solid-state switches 16 and 18 during the circuit breaking process of the solid-state switches 16 and 18 is detected by the overcurrent detecting device 26; and the conducting status of the solid-state switches 16 and 18 is maintained when an anomalous value is indicated by the detected current of the current detecting device 26. For this reason, for the case of the present embodiment as well, circuit breaking of the solid-state switches 15 and 18 when the circuit breaking capability is exceeded by the solid-state switches 16 and 18 can be prevented, and the reliability of the solid-state switches 16 and 18 can be promoted.

Furthermore, concerning the present invention, as in the previous embodiment, when the maintained status of the solid-state switches 16 and 18 exceeds the set time period, the circuit breaker 14 is interrupted, and the solid-state switches 16 and 18 is protected.

As explained above, according to the present invention, when a structure of which the solid state switches are connected in parallel in the main circuit switch, circuit breaking of the solid-state switches can be prevented at the point they exceed the circuit breaking capability, even though there is a delay in the commutation start time by the instability of the arc produced during the opening of the main circuit switch 12 and even though the commutation time is long, because the solid-state switches 16 and 18 are circuit broken only when the commutation during the process of opening the main circuit switch 12 is in a normal status. Therefore, reliability of the solid-state switches can be promoted.

Moreover, when the solid-state switches are incorporated in the main circuit and a current limiting impedance element is connected in parallel with these solid-state switches, circuit breaking of the solid-state switches can be prevented at the point they exceed the circuit breaking capability, because the conducting status of the solid-state switches is maintained when the current flowing in the solid-state switches indicates an anomalous value during the circuit breaking process of the solid-state switches at the time of a fault. Therefore, reliability of the solid-state switches can be promoted.

What is claimed is:

1. A current limiting circuit breaker comprising
   a main circuit switch inserted in a line of power supply lines that constitute a main circuit;
   a solid-state switch connected in parallel with said main circuit switch;
   fault detecting means for detecting a fault in relation with a power supply of said main circuit;
   fault time command means for commanding to open said main circuit switch and to close said solid-state switch responsive to a detected output of said fault detecting means;
   commutation detecting means for detecting a current flowing in said solid-state switch; and
   circuit breaking operation means for circuit breaking said solid-state switch when a detected current of said commutation detecting means during the opening process of said main circuit switch indicates a normal value.

2. The current limiting circuit breaker of claims 1, wherein said solid-state switch is constituted by a switched valve device.

3. The current limiting circuit breaker of claims 1, wherein said solid-state switch is constituted by a GTO (gate turn off) thyristor.

4. The current limiting circuit breaker of claims 1, wherein said solid-state switch is constituted by an IGBT (insulated gate bipolar transistor).

5. The current limiting circuit breaker of claims 1, wherein said solid-state switch is constituted by a plurality of switched valve devices and said switched valve devices are connected in an inverse-parallel fashion.

6. The current limiting circuit breaker of claims 1, wherein said solid-state switch is constituted by a plurality of GTO thyristors and said GTO thyristors are connected in an inverse-parallel fashion.

7. The current limiting circuit breaker of claims 1, wherein said solid-state switch is constituted by a plurality of IGBTs and said IGBTs are connected in an inverse-parallel fashion.

8. A current limiting circuit breaker comprising a main circuit switch inserted in a line of power supply lines that constitute a main circuit;

a solid-state switch connected in parallel with said main circuit switch;

fault detecting means for detecting a fault in relation with a power supply of said main circuit;

fault time command means for commanding to open said main circuit switch and to close said solid-state switch responsive to a detected output of said fault detecting means;

commutation detecting means for detecting a current flowing in said solid-state switch;

circuit breaking operation means for circuit breaking said solid-state switch when a detected current of said commutation detecting means during the opening process of said main circuit switch indicates a normal value;

maintaining means for maintaining the conducting status of said solid-state switch when a detected current of said-commutation detecting means indicates a normal value when said solid-state switch is ordered to conduct by said fault time command means; and support circuit breaking command means for yielding a circuit breaking command to a circuit breaker connected in series with said main circuit switch when the maintaining status of said solid-state switch according to said maintaining means exceeds a set time period.

9. The current limiting circuit breaker of claims 3, wherein the set time period for maintaining the conducting status of said solid-state switch according to said maintaining means is set in response to a time needed for inverting the phase of a current at the time of the fault detection from the time a fault is detected by said fault detecting means.

10. A current limiting circuit breaker comprising a main circuit switch inserted in a line of power supply lines that constitute a main circuit;

a solid-state switch connected in parallel with said main circuit switch;

fault detecting means for detecting a fault in relation with a power supply of said main circuit;

fault time command means for commanding to open said main circuit switch and to close said solid-state switch responsive to a detected output of said fault detecting means;

commutation detecting means for detecting a current flowing in said solid-state switch;

circuit breaking operation means for circuit breaking said solid-state switch when a detected current of said commutation detecting means during the opening process of said main circuit switch indicates a normal value; and maintaining means for maintaining the conducting status of said solid-state switch when a detected current of said commutation detecting means indicates a normal value when said solid-state switch is ordered to conduct by said fault time command means.

11. A current limiting circuit breaker comprising a main circuit switch inserted in a line of power supply lines that constitute a main circuit;

a solid-state switch connected in parallel with said main circuit switch as a commutation circuit;

fault detecting means for detecting a fault in relation with a power supply of said main circuit;

fault time command means for commanding to open said main circuit switch and to close said solid-state switch responsive to a detected output of said fault detecting means;

main circuit current detecting means for detecting a current of said main circuit;

commutation detecting means for detecting a current flowing in said solid-state switch;

main circuit current deciding means for deciding whether or not a detected output of said main circuit current detecting means has exceeded a set value for anomaly;

commutation deciding means for deciding whether or not a detected output of said commutation detecting means has exceeded a set value for anomaly; and circuit breaking command means for commanding to circuit break said solid-state switch in the opening process of said main circuit switch, with the condition that both of the output results of said main circuit current deciding means and said commutation deciding means are in the negative.

12. A current limiting circuit breaker comprising a main circuit switch inserted in a line of power supply lines that constitute a main circuit;

a solid-state switch connected in parallel with said main circuit switch as a commutation circuit;

fault detecting means for detecting a fault in relation with a power supply of said main circuit;

fault time command means for commanding to open said main circuit switch and to close said solid-state switch responsive to a detected output of said fault detecting means;

main circuit current detecting means for detecting a current of said main circuit;

commutation detecting means for detecting a current flowing in said solid-state switch;

main circuit current deciding means for deciding whether or not a detected output of said main circuit current detecting means has exceeded a set value for anomaly;

commutation deciding means for deciding whether or not a detected output of said commutation detecting means has exceeded a set value for anomaly;

circuit breaking command means for commanding to circuit break said solid-state switch in the opening process of said main circuit switch, with the condition that both of the output results of said main circuit current deciding means and said commutation deciding means are in the negative; and maintaining means for maintaining the conducting status of said solid-state switch when the decided output of either said main circuit current deciding means and said commutation deciding means, when said solid-state switch is conducting in accordance with a command of said fault time command means, is in the affirmative.

13. A current limiting circuit breaker comprising a main circuit switch inserted in a line of power supply lines that constitute a main circuit;

a solid-state switch connected in parallel with said main circuit switch as a commutation circuit;

fault detecting means for detecting a fault in relation with a power supply of said main circuit;

fault time command means for commanding to open said main circuit switch and to close said solid-state switch responsive to a detected output of said fault detecting means;

main circuit current detecting means for detecting a current of said main circuit;

commutation detecting means for detecting a current flowing in said solid-state switch;

main circuit current deciding means for deciding whether or not a detected output of said main circuit current detecting means has exceeded a set value for anomaly;

commutation deciding means for deciding whether or not a detected output of said commutation detecting means has exceeded a set value for anomaly;

circuit breaking command means for commanding to circuit break said solid-state switch in the opening process of said main circuit switch, with the condition that both of the output results of said main circuit current deciding means and said commutation deciding means are in the negative;

maintaining means for maintaining the conducting status of said solid-state switch when the decided output of either said main circuit current deciding means and said commutation deciding means, when said solid-state switch is conducting in accordance with a command of said fault time command means, is in the affirmative; and support circuit breaking command means for yielding a circuit breaking command to a circuit breaker connected in series with said main circuit switch when the maintaining status of said solid-state switch according to said maintaining means exceeds a set time period.

14. A current limiting circuit breaker comprising a solid-state switch inserted in a line of power supply lines that constitute a main circuit;

a current limiting impedance element connected in parallel with said solid-state switch;

fault detecting means for detecting a fault in relation with a power supply of said main circuit;

circuit breaking command means for commanding to circuit break said solid-state switch in response to a detected output of said fault detecting means;

main circuit current detecting means for detecting a current flowing in said solid-state switch; and maintaining means for maintaining the conducting status of said solid-state switch when a detected current of said main circuit current detecting means indicate an anomalous value during the circuit breaking process of said solid-state switch.

15. A current limiting circuit breaker comprising a solid-state switch inserted in a line of power supply lines that constitute a main circuit;

a current limiting impedance element connected in parallel with said solid-state switch;

fault detecting means for detecting a fault in relation with a power supply of said main circuit;

circuit breaking command means for commanding to circuit break said solid-state switch in response to a detected output of said fault detecting means;

main circuit current detecting means for detecting a current flowing in said solid-state switch;

maintaining means for maintaining the conducting status of said solid-state switch when a detected current of said main circuit current detecting means indicate an anomalous value during the circuit breaking process of said solid-state switch; and support circuit breaking command means for yielding a circuit breaking command to a circuit breaker connected in series with said solid-state switch when the maintaining status of said solid-state switch according to said maintaining means exceeds a set time period.

* * * * *